United States Patent [19]

Jensen et al.

[11] Patent Number: 4,827,777
[45] Date of Patent: May 9, 1989

[54] OSCILLATING JET METER

[75] Inventors: Niels D. Jensen, Bjerringbro; Kurt F. Nielsen, Middelfart; Bent Larsen, Bjerringbro, all of Denmark

[73] Assignee: Grundfos International A/S, Bjerringbro, Denmark

[21] Appl. No.: 253,349

[22] Filed: Sep. 29, 1988

Related U.S. Application Data

[63] Continuation of Ser. No. 28,481, Mar. 20, 1987, abandoned.

[30] Foreign Application Priority Data

Mar. 22, 1986 [DE] Fed. Rep. of Germany ....... 3609748

[51] Int. Cl.[4] ................................................ G01F 1/20
[52] U.S. Cl. .................................. 73/861.19; 137/833
[58] Field of Search ........... 73/861.19, 861.18, 861.21, 73/273; 137/833, 834, 835

[56] References Cited

U.S. PATENT DOCUMENTS

| | | | |
|---|---|---|---|
| 3,889,534 | 6/1975 | Grant | 73/861.19 |
| 4,061,032 | 12/1977 | Friebel | 73/273 |
| 4,085,615 | 4/1978 | Haefner et al. | 73/861.19 |
| 4,107,990 | 8/1978 | Ringwall | 73/861.19 |
| 4,610,162 | 9/1986 | Okabayashi et al. | 73/197 |

FOREIGN PATENT DOCUMENTS 77107456 5/1979 Sweden .
1593680 7/1981 United Kingdom .

OTHER PUBLICATIONS

"Fluidic Oscillator Measures Flow", N. Andreiev, *Control Engineering* vol. 20 No. 9, Sept. 1973 pp. 56–57.

*Primary Examiner*—Stewart J. Levy
*Assistant Examiner*—Robert P. Bell
*Attorney, Agent, or Firm*—Michael N. Meller

[57] ABSTRACT

The invention relates to an oscillating jet meter for fluids, with an assembly in which are formed substantially the chambers and passages of the flow system conveying the fluid, and wherein the inlet and outlet openings of the flow system are in communication with respective pipe connections for the installation of the meter. An oscillating fluid jet is generated in the flow system, the frequency of which within the designated measurement range is at least approximately proportional to the flow velocity of the fluid and which is measured with a measuring instrument so as to determine the throughflow of the fluid in a calculating unit. The aforementioned assembly is in the form of a housing which is closed, except for the inlet and outlet openings, whereas the housing is surrounded on all sides by a pressure-tight casing which carries the two pipe connections.

4 Claims, 4 Drawing Sheets

OSCILLATING JET METER

This application is a continuation of application Ser. No. 028,481, filed 3/20/87 now abandoned.

FIELD OF THE INVENTION

The invention relates to an oscillating jet meter for fluids. The oscillating jet meter of the invention comprises an assembly in which the chambers and passages of the flow system conveying the fluid are formed. The inlet opening and outlet opening of the flow system are in communication with respective pipe connections for the installation of the meter. An oscillating fluid jet is generated in the flow system, the frequency of which within the designated measurement range is at least approximately proportional to the flow velocity of the fluid and which is measured with a measuring instrument so that the throughflow of the fluid can be determined in a calulating unit.

BACKGROUND OF THE INVENTION

The oscillating jet meter occupies a special position among direct and indirect volumetric meters, because this type of meter can be designed to have no moving parts and thus generally has a long service life. Moreover, meters of this type operate with high measuring accuracy over a relatively wide measuring range.

The mode of operation of the oscillating jet meter is based on the flow pressure oscillating in a plane, which has a vertical component relative to the mass throughflow and thus induces a periodic directional changes in mass flow. Behavior of this type is exhibited by flow systems which, for example, are based on the Coanda effect or other effects known per se. A liquid or gas jet emerging from a sharp-edged outlet into a chamber of larger cross section having a stream divider is unstable. The free jet entrains fluid particles asymmetrically from one of the corners of the chamber because of the abrupt widening in cross section, so that an underpressure is created there and the fluid jet is deflected sideways.

The fluid in the return line, which is in the form of an annular passage, then undergoes a movement which induces a flow pressure and forces the deflected mass jet beyond its central position into the other flow direction. In this way an oscillating fluid jet is then formed, the frequency of which is proportional, within certain limits, to the flow velocity of the fluid, so that by measuring the frequency the throughflow can be determined.

In spite of their simple construction, commercially available oscillating jet meters have certain disadvantages because they are machined from a metal material, such as cast iron or bronze, and this material must not only resist corrosion, erosion and abrasion by the fluid but also must form the pressure-resistant boundary between the meter and the environment. Such differences in function necessarily lead to compromises if the meter has to be made from a single material. Moreover, a machining operation involves relatively high production costs.

Oscillating jet meters are also known, for examples as described in Swedish patent application No. 77 10 745-6, wherein the chambers and passages of the flow system, which accommodate and convey the fluid, take the form of an assembly which is injection-molded from plastic material and in which the cavities of the flow system open towards one face of the assembly have to be sealed off from the environment. This is effected by covering the respective open side of the assembly with a metal plate, whereas a cast component carrying the pipe connection is provided on the other closed face of the assembly, so that the metal parts disposed on either side of the assembly can be connected to one another by screws and the assembly can be clamped between them.

In view of the surface finish of this flow system, which essentially consists of plastic material, an oscillating jet meter of this type does have advantages over other known meters. However, this oscillating jet meter also has certain drawbacks because in the passages and chambers of the flow system which are normally of rectangular cross section, only the lower wall and the two side walls have smooth plastic surfaces and the upper boundary wall has favorable hydrodynamic properties only when the inside of the covering metal plate has been correspondingly machined.

Furthermore, even with the additional use of sealants, sealing difficulties are encountered in meters of this type, particularly when the fluid is at high pressure and high temperature. These meters are also relatively heavy and necessitate high material and production costs.

BRIEF SUMMARY OF THE INVENTION

It is the object of the invention to devise an oscillating jet meter which operates with high measuring accuracy and which, although simply and economically constructed, entails no sealing problems.

To achieve this object, the oscillating jet meter in accordance with the invention has a housing which is closed, except for the inlet opening and outlet opening, and is surrounded on all sides by a casing which carries the two pipe connections.

The housing is made entirely of plastic or metal by pressing or molding. The passages and chambers of the flow system have an overall smooth surface as a result of the production process and, moreover, with appropriate choice of material, they are resistant to corrosion. Sealing problems of the type mentioned above are eliminated because the housing is closed and only needs the two openings normally provided, which are in communication with the pipe connections on the casing.

If the fluid to be measured contains abrasive impurities, the region of the flow system and/or housing exposed thereto can be made of metal or ceramic material and be inserted as an assembly, comprising one or more parts, into the housing otherwise consisting of plastic material.

The inherent disadvantages properties of the housing materials, namely unfavorable creep behavior in plastic materials as well as a inadequate bending strength and extreme brittleness in ceramic materials, are obviated by the design in accordance with the invention. In fact, the housing is merely exposed to a pressure which is lower than the pressure loss of the measuring instrument, which, in turn, is only a fraction of the system pressure. Moreover, the two pipe connections are disposed on the outer casing so that any forces acting on the meter via attached pipelines cannot mechanically subject the flow system to pressure, tension or bending.

As a result of this separation of functions, namely using the outer casing to accommodate the mechanical load extended on the meter and measuring instrument by the system pressure and pipeline forces respectively, and enabling the flow system surrounded by the outer casing to be determined in respect of its mode of production and choice of material solely from the standpoints of fluid mechanics and resistance to the fluid, an oscillating jet meter is devised which will have substantially longer service life and greater measurement stability than hitherto known meters and which, furthermore, can be produced at lower cost.

By combination with a temperature-differential measuring instrument and by expanding the frequency measuring instrument with a calculating unit, it is possible to transform the oscillating jet meter into a meter of the type currently specified in various countries for rented apartment buildings.

BRIEF DESCRIPTION OF THE DRAWING

Further features and advantages of the oscillating jet meter according to the invention will be apparent from the following description of the preferred embodiments shown in the accompanying drawings, wherein.

DETAILED DESCRIPTION OF THE PREFERRED EMBODIMENTS

Figure 1:
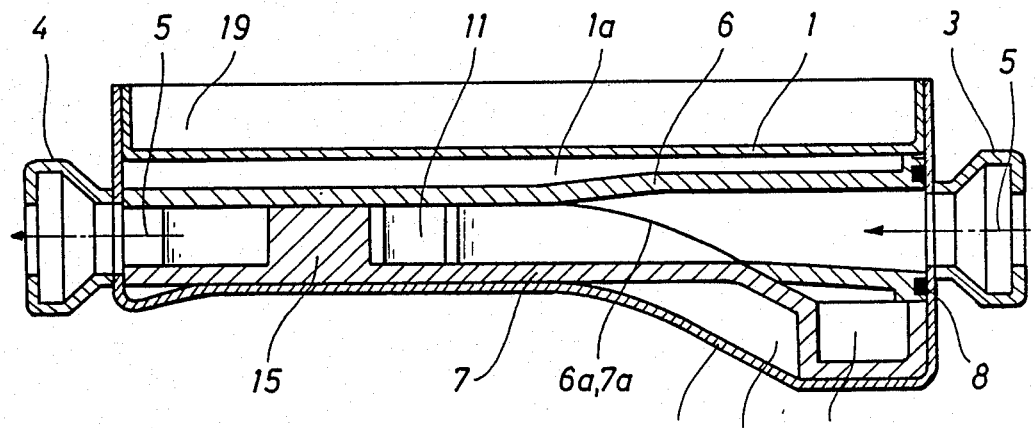
FIG. 1 shows a longitudinal section through an oscillating jet meter in accordance with the invention.

The illustrated oscillating jet meter may be used, for example, as a water meter. It comprises an outer casing, for example, of stainless steel or non-metallic material; the casing comprises a cover 1 and a similarly compression-molded part 2 which, for example, are welded together in the peripheral zone of the cover. It is also possible to effect the connection with adhesive or other conventional fastening means.

Two pipe connections 3 and 4 are mounted on the casing part 2 and enable the meter to be installed in a pipeline of a water-circulating installation, such as a heating unit. In the meter shown in FIG. 1, the connections 3, 4 are disposed on a common axis 5 so that the meter can be installed in accordance with the in-line principle.

The casing 1, 2 completely encloses a plastic housing composed of two parts 6, 7. The two housing parts are joined together in a flush-tight manner in the vicinity of a separating plane 6a, 67a and they are sealed with respect to the outer casing 1, 2 at least one of the connections 3, 4. In the embodiment shown by way of example in FIG. 1, the seal is provided by an O-ring 8 at the inlet connection so that a chamber 1a formed between the casing and the housing in in communication with an adjacent flow passage in the housing only at one unsealed location in the vicinity of the outlet connection 4. Therefore, in this case the casing has to form a pressure-resistant boundary between the unit and the environment. This solution is advantageous insofar as the walls of the housing 6, 7 are only subjected to a pressure corresponding to the pressure loss in the meter and can thus be made relatively thin.

Of course, it is also possible for the flow passages in the housing 6, 7 to be completely closed off with respect to the casing 1, 2 by the provision of a further seal in the vicinity of the outlet connection 4, this seal being effective, like the O-ring 8, between the housing and the casing. A solution of this type is applied when measuring gas flows at a pressure slightly in excess of atmospheric. Generally, it is not necessary in this case for the casing 1, 2 to form the pressure-resistant boundary with respect to the environment, so that the design of the casing need only accommodate externally acting forces and can enclose the installed housing in a correspondingly secure manner. Of course, with this design it is necessary to ensure that the walls of the housing 6, 7 are correspondingly stable, since the full system pressure acts on them.

Figure 2:
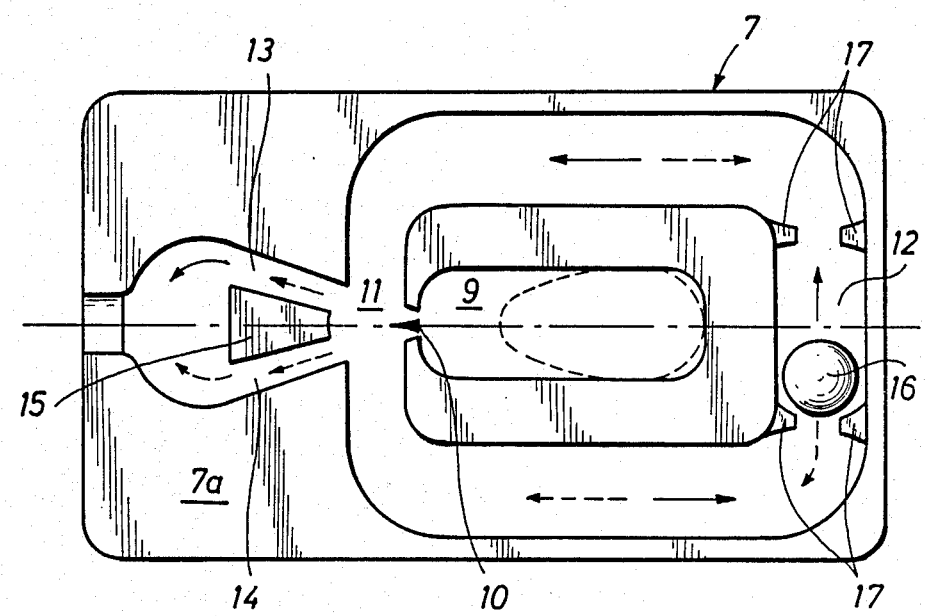
FIG. 2 shows a plan view of the lower part of a two-part housing.

As shown in FIG. 2, the fluid enters the meter through the inlet connection 3 and initially arrives in an inlet chamber 9. It then passes through an outlet opening 10 into a chamber 11 which forms both a widening cross section and a part of an annular return duct 12. The fluid jet entering the chamber 11 will flow either through a passage 13 or a passage 14 around a barrier member or stream divider 15 to the outlet connection 4. As a result of the respective positions of the fluid jet a pressure difference is created in the chamber 11, which induces a movement in the fluid situated in the return duct 12 and allows the jet to be shifted into the other position, so that the fluid jet will oscillate as a result of the unstable conditions.

As already mentioned at the beginning, the flow through the meter can be determined by direct or indirect measurement of the oscillation frequency of the fluid jet. This can be carried out, for example, in accordance with the same principle of the aforementioned Swedish patent application, by providing in the annular passage 12 a metal ball 16 which is adjustable to a limited extent between two stops 17 under the action of the fluid. The frequency and direction of movement of this ball depend on the variations in flow direction of the fluid in the annular passage. Ball movement can then be detected externally by electromagnetic means using a sensor (not shown). It is possible to determine directly therefrom the oscillation frequency of the fluid jet and hence the flow velocity, after corresponding recalculation.

Figure 3:
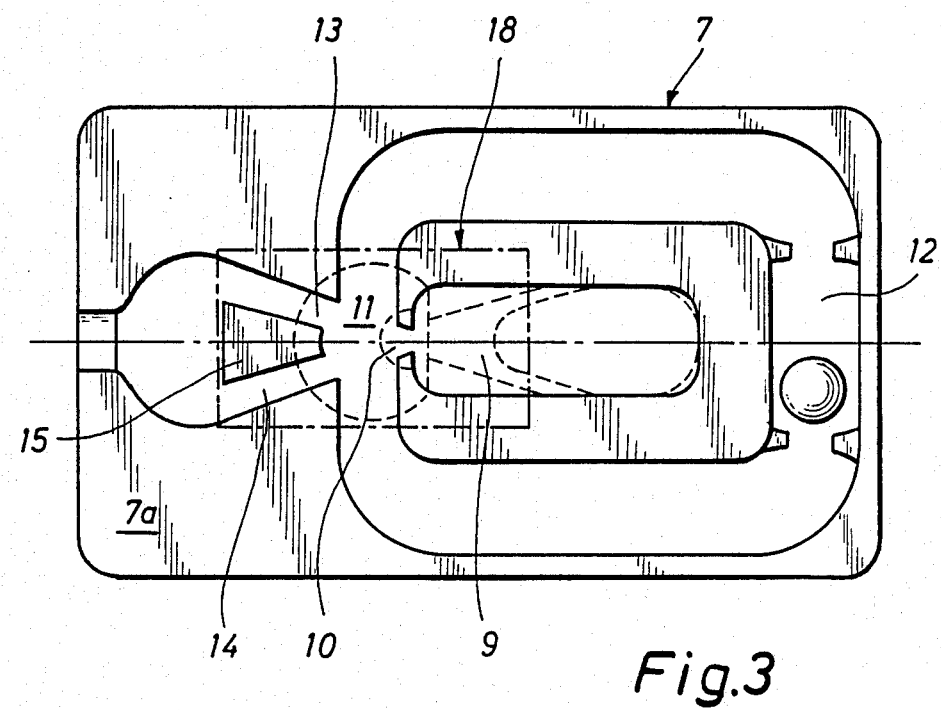
FIG. 3 shows a plan view corresponding to FIG. 2, with an assembly made of ceramic material or metal.

The meter illustrated in FIGS. 1 and 2 is particularly intended for a fluid without abrasive impurities. A suitable solution for fluids containing abrasive impurities is shown diagrammatically in FIG. 3. Here those parts of the flow system which influence measuring accuracy and which are affected by abrasion are made of ceramic or other suitable material. A ceraic block 18, the rectangular outline of which is indicated by the dash-dot line and in which a part of the chamber 9, the outlet opening 10, the chamber 11, the passages 13 and 14 and also the barrier member 15 are situated, is inserted in a correspondingly shaped recess of the housing part 7 and secured in position. The ceramic block 18 could also be designed as a multipart assembly if this were to offer advantages with respect to production technique or easier installation.

A ceramic block 18 composed of one or more parts is particularly useful in the case of water containing abrasive impurities, whereas a metal block for example, consisting of aluminum, is suitable when gases are to be measured.

An evident in FIGS. 1 and 2, the annular return duct 12 of the flow system extends along a path which is curved downwards spatially (FIG. 1), so that the part of the return duct on the right-hand side of the drawing is situated below the axis 5, whereby both pipe connections 3, 4 can lie on the same axis in accordance with the in-line principle. Moreover, a correspondingly low construction height is achieved with this solution.

Figure 4:
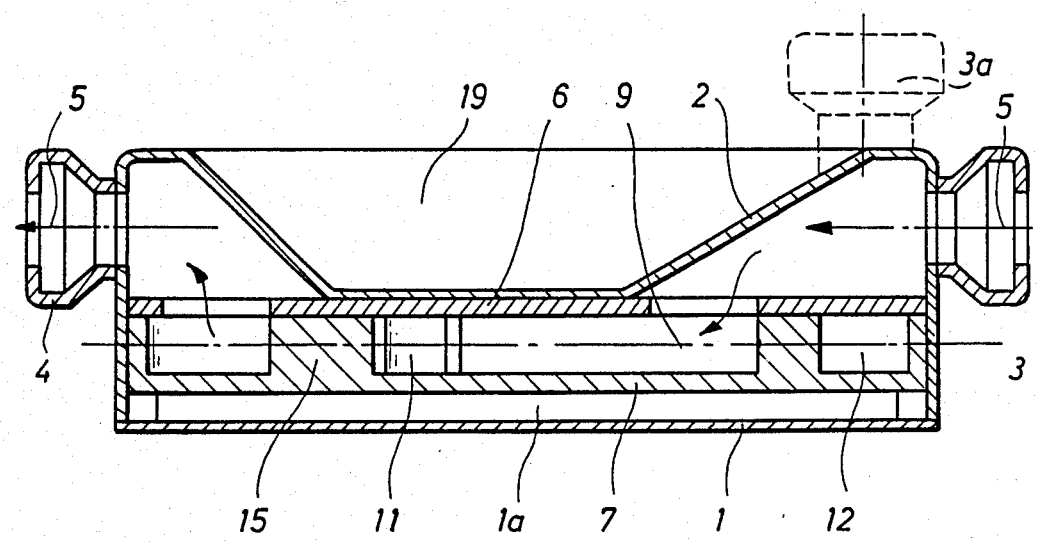
FIG. 4 shows a longitudinal section through a meter of different design.

FIG. 4 shows an oscillating jet meter in which the flow system lies in a straight plane and the connections 3, 4 can be disposed either on the common axis 5 or else at right angles to one another, for example, by substituting connection 3a, indicated by dashed lines, in place of connection 3.

In the two embodiments according to FIGS. 1 to 4, by suitably shaping the casing part 1 or 2 it is possible to provide a free chamber 19 which is accessible from the exterior and which can be closed off from the environment by a cover (not shown in detail). This chamber can then accommodate calculating equipment, parts of the frequency measuring device, batteries and the like.

Figure 5:
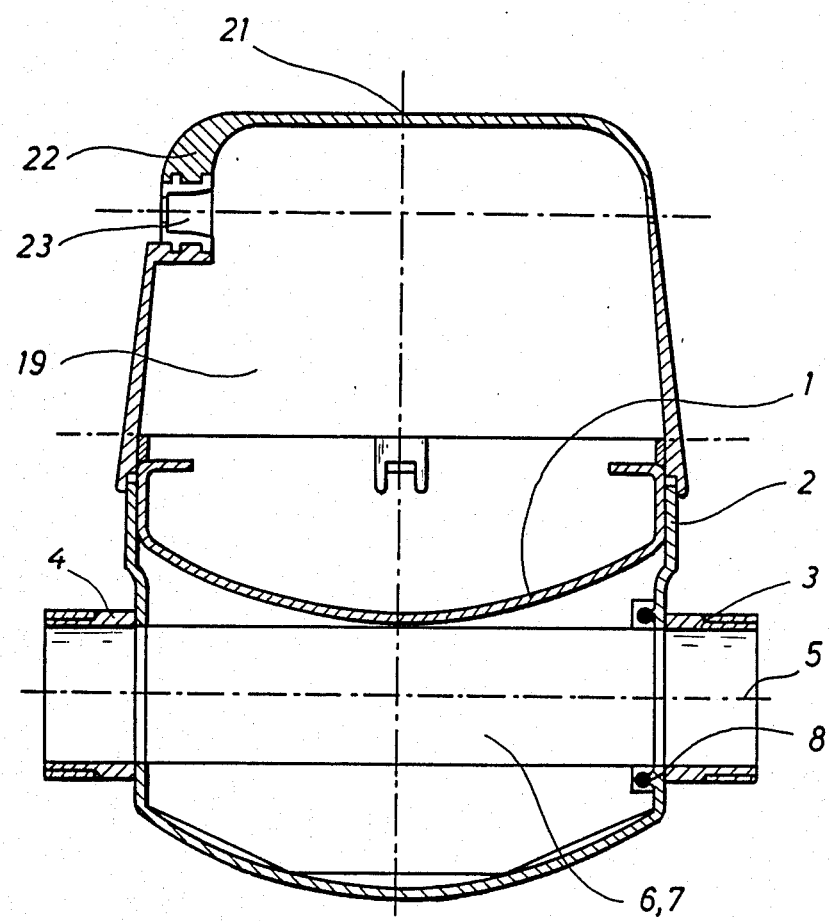
FIG. 5 shows in section an oscillating jet meter with a rotationally symmetrical casing.
Figure 6:
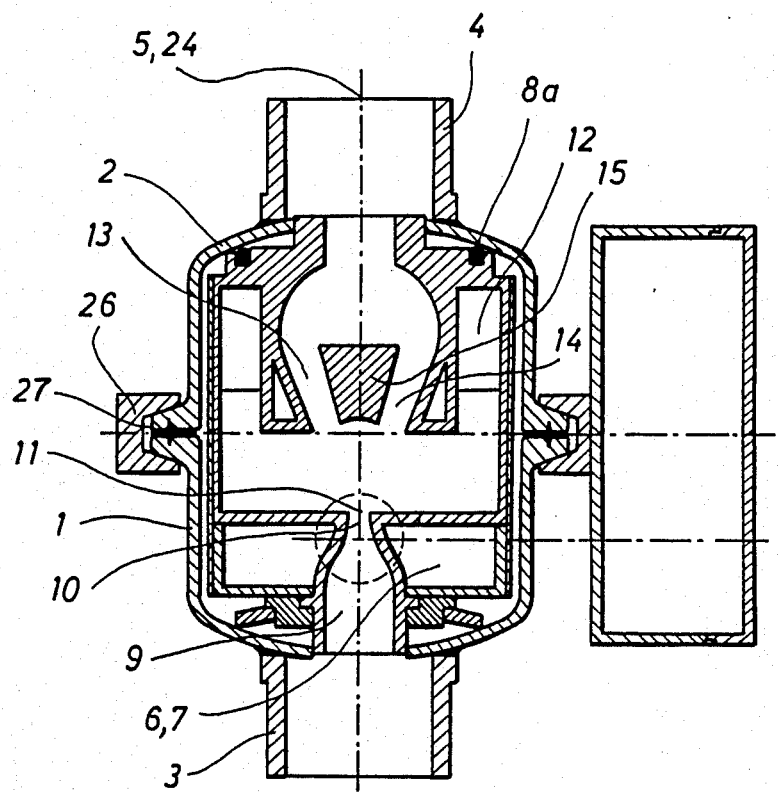
FIG. 6 shows another embodiment of an oscillating jet meter with a rotationally symmetrical casing.

FIG. 5 shows another embodiment of an oscillating jet meter. Here the casing shown in section comprises two rotationally symmetrical parts 1 and 2. The assembly composed of two plastic parts 6 and 7 contains the flow system which has been described above in connection with the other embodiments and which, for greater clarity, has not been shown again in this section. At the inlet connection 3 the housing 6, 7 is sealed with respect to the casing part 2 by the O-ring 8 so that the entire fluid stream has to flow through the flow system.

In this embodiment the center line 5 passing through the connections 3, 4 and the center line 21 of the casing parts intersect at, or approximately at, right angles. A cover 22, which is attached to the casing part 1 by screw-like elements 23, makes it possible to make chamber 19 accessible from the exterior for installation of the electronic and calculating equipment.

Finally, FIG. 5 shows another variant of the oscillating jet meter with rotationally symmetrical casing parts 1 and 2. However, the center line 5 of the connections 3, 4 is simultaneously the center line 24 of the casing parts. The assembly, which is again composed of two plastic parts 6 and 7, contains the flow system and all the necessary passages and the already described assembly parts.

At the inlet the assembly is sealed with respect to the casing part 1 by an O-ring 25 so that, the entire fluid stream is constrained to flow through the flow system.

In this case, the connection between the casing parts 1 and 2 is effected in a way different than that in the oscillating jet meter according to FIG. 5. These parts are held together by a metal ring 26 which form locks outer flanges of the casing parts. By inserting a shaped seal 27 in the vicinity of the joint, the casing parts can be joined in a pressure-tight manner even without a welded joint.

We claim:

1. In an oscillating jet meter for fluids, comprising first and second pipe connection means for installing said meter in a pipeline, inlet means coupled to said first pipe connection means for intaking a flow of fluid in said pipeline, outlet means coupled to said second pipe connection means for discharging said fluid flow to said pipeline, oscillating flow channel means for coupling said fluid flow from said inlet means to said outlet means in a manner whereby an oscillating fluid jet is generated in said channel means during throughflow of said fluid, and measuring means for measuring the frequency of said oscillating fluid jet in said channel means, the improvement wherein said channel means comprises a plastic housing which is closed except for said inlet and outlet means, and said meter further comprises a pressure-tight metal casing which surrounds said plastic housing and which is connected to said first and second pipe connection means.

2. The oscillating jet meter as defined in claim 1, wherein said channel means further comprises an insert made of a material selected from the group comprising metals and ceramics, said insert being incorporated in said plastic housing.

3. The oscillating jet meter as defined in claim 1, wherein said casing comprises first and second rotationally symmetrical parts joined together, a center line of said first and second rotationally symmetrical parts intersecting a center line of said first and second pipe connection means at an angle substantially equal to ninety degrees.

4. The oscillating jet meter as defined in claim 1, wherein said casing comprises first and second rotationally symmetrical part joined together, a center line of said first and second rotationally symmetrical parts coinciding with a center line of said first and second pipe connection means.

* * * * *